(12) United States Patent
Wolschleger et al.

(10) Patent No.: US 10,899,902 B2
(45) Date of Patent: Jan. 26, 2021

(54) HEAT EXPANDABLE FOAM

(71) Applicant: SIKA TECHNOLOGY AG, Baar (CH)

(72) Inventors: Leslie Michele Wolschleger, Clarkston, MI (US); Jena Mabilia, Madison Heights, MI (US); Sascha Pasula, Thalwil (CH)

(73) Assignee: SIKA TECHNOLOGY AG, Baar (CH)

( * ) Notice: Subject to any disclaimer, the term of this patent is extended or adjusted under 35 U.S.C. 154(b) by 113 days.

(21) Appl. No.: 15/750,043

(22) PCT Filed: Jun. 22, 2016

(86) PCT No.: PCT/EP2016/064366
§ 371 (c)(1),
(2) Date: Feb. 2, 2018

(87) PCT Pub. No.: WO2017/036624
PCT Pub. Date: Mar. 9, 2017

(65) Prior Publication Data
US 2018/0223065 A1 Aug. 9, 2018

Related U.S. Application Data (63) Continuation-in-part of application No. 14/746,289, filed on Sep. 2, 2015, now abandoned.

(51) Int. Cl.
| | |
|---|---|
| *C08J 9/00* | (2006.01) |
| *C08J 9/06* | (2006.01) |
| *C08J 9/10* | (2006.01) |
| *B62D 29/00* | (2006.01) |
| *C08J 9/08* | (2006.01) |
| *C09K 3/10* | (2006.01) |
| *C08L 23/08* | (2006.01) |
| *B60R 13/08* | (2006.01) |

(52) U.S. Cl.
CPC .......... *C08J 9/105* (2013.01); *B60R 13/0815* (2013.01); *B62D 29/002* (2013.01); *C08J 9/0061* (2013.01); *C08J 9/08* (2013.01); *C08J 9/104* (2013.01); *C08L 23/08* (2013.01); *C08L 23/0815* (2013.01); *C08L 23/0853* (2013.01); *C09K 3/10* (2013.01); *C09K 3/1025* (2013.01); *B60Y 2306/09* (2013.01); *C08J 2203/02* (2013.01); *C08J 2203/04* (2013.01); *C08J 2203/18* (2013.01); *C08J 2207/00* (2013.01); *C08J 2323/06* (2013.01); *C08J 2323/08* (2013.01); *C08J 2331/04* (2013.01); *C08J 2333/08* (2013.01); *C08J 2333/10* (2013.01); *C08J 2423/06* (2013.01); *C08J 2423/08* (2013.01); *C08J 2431/04* (2013.01); *C08J 2433/08* (2013.01); *C08J 2433/10* (2013.01); *C09K 2003/1059* (2013.01)

(58) Field of Classification Search
CPC ........ C08J 9/105; C08J 9/104; C08J 2203/04; C08J 2323/16; C08J 2323/06; B60R 13/0815
See application file for complete search history.

(56) References Cited

U.S. PATENT DOCUMENTS

| | | | |
|---|---|---|---|
| 6,111,020 A * | 8/2000 | Oriani | C08L 23/08 521/144 |
| 2005/0096401 A1 | 5/2005 | Duffin et al. | |
| 2007/0249743 A1 | 10/2007 | Sehanobish et al. | |
| 2007/0265364 A1 | 11/2007 | Oner-Deliomanli et al. | |
| 2008/0090983 A1* | 4/2008 | Satoh | C08F 10/00 526/348.2 |
| 2009/0239962 A1 | 9/2009 | Dobashi | |
| 2015/0225527 A1* | 8/2015 | Gossi | C08J 9/103 521/95 |

FOREIGN PATENT DOCUMENTS

| | | | | |
|---|---|---|---|---|
| CN | 1812909 A | * | 8/2006 | ........... B29C 44/188 |
| CN | 1812909 A | | 8/2006 | |
| JP | S60-58440 A | | 4/1985 | |
| JP | 2002-275299 A | | 9/2002 | |
| JP | 2003-306569 A | | 10/2003 | |
| JP | 2008-542508 A | | 11/2008 | |
| WO | 02/00420 A1 | | 1/2002 | |
| WO | 2006/131190 A1 | | 12/2006 | |
| WO | 2008/034755 A1 | | 3/2008 | |
| WO | 2014/040913 A1 | | 3/2014 | |
| WO | WO-2014040913 A1 | * | 3/2014 | |

OTHER PUBLICATIONS

Dec. 12, 2018 Office Action Issued in European Patent No. 16731860.9.
Aug. 24, 2016 Search Report issued in International Patent Application No. PCT/EP2016/064366.
Aug. 24, 2016 Written Opinion issued in International Patent Application No. PCT/EP2016/064366.
Jun. 4, 2020 Office Action issued Chinese Patent Application No. 201680050029.8.
Aug. 4, 2020 Office Action issued in Japanese Patent Application No. 2018-508750.

* cited by examiner

Primary Examiner — Kara B Boyle
(74) Attorney, Agent, or Firm — Oliff PLC (57) ABSTRACT

A composition for an expandable sealant including at least one polymeric material selected from the group consisting of low density polyethylenes (LDPE), linear low density polyethylenes (LLPDE), ethylene vinyl acetate (EVA), ethylene methacrylate (EMA), and ethylene-butyl acrylate (EnBA); and a chemical blowing agent, wherein the composition is substantially free of a cross-linking agent.

3 Claims, 2 Drawing Sheets

HEAT EXPANDABLE FOAM

FIELD

The present disclosure relates to heat expandable foams.

BACKGROUND

This section provides background information related to the present disclosure which is not necessarily prior art.

Heat expandable sealant and baffle compositions may be formed into a desired shape so that upon insertion of the sealant into a cavity such as the hollow post structure of an automobile or other vehicle, followed by heat induced expansion thereof, it serves as a highly effective sealant and acoustic baffle within that cavity.

In particular, heat expansible sealants and baffle compositions, which after being formed into a desired configuration, are adapted to be placed within a vehicle post or other body cavity in a position such that when the vehicle body is subjected to a primer (e.g., an e-coat) and/or paint baking operation or other process which elevates the temperature of the environment surrounding the vehicle body, the shaped sealant and baffle product expands to an extent that the expanded component serves to attenuate noise (e.g., road noise) that would otherwise pass through the cavity. The expanded product also functions to seal the cavity and thereby prevent infiltration of moisture, dust, air, other undesirable fluids, and sound.

The above-noted heat expandable sealant and baffle compositions may include elastomeric- or thermoplastic-based materials and a chemical blowing agent. Typically, these compositions also include a crosslinking agent that cures the elastomeric- or thermoplastic-based materials when heated. To ensure proper expansion of the material during heating of the compositions, however, the reactive chemistry involved in curing the elastomeric- or thermoplastic-based materials and activation of the chemical blowing agent needs to be properly timed so that curing and activation of the blowing agent occur simultaneously to achieve the optimum expansion of the compositions. Further, if the unfoamed compositions are inadvertently subjected to elevated temperatures or humidity before being inserted into the cavity to be sealed, curing of the materials may be initiated prematurely, which may result in a reduced final expansion of the material, or may result in undesirable cracking, skinning, or inhomogeneous foam quality.

SUMMARY

This section provides a general summary of the disclosure, and is not a comprehensive disclosure of its full scope or all of its features.

The present disclosure provides a composition for an expandable sealant, including at least one polymeric material preferably selected from the group consisting of low density polyethylenes (LDPE), linear low density polyethylenes (LLPDE), ethylene vinyl acetate (EVA), ethylene methacrylate (EMA), and ethylene-butyl acrylate (EnBA); and a chemical blowing agent, wherein the composition is substantially free of a cross-linking agent.

The present disclosure also provides an expansible sealant and baffle component for sealing and providing an acoustic baffle for a cavity that is subjected to a predetermined elevated temperature during a manufacturing operation. The component includes a polymeric material, preferably selected from the group consisting of low density polyethylenes (LDPE), linear low density polyethylenes (LLPDE), ethylene vinyl acetate (EVA), ethylene methacrylate (EMA), ethylene-butyl acrylate (EnBA), and mixtures thereof; and a chemical blowing agent, preferably selected from the group consisting of 4,4'-oxybis(benzenesulfonylhydrazide) and sodium bicarbonate; wherein the component is substantially free of a cross-linking agent.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The present disclosure is directed to compositions for a heat expandable sealant or acoustic baffles for a vehicle In accordance with the present disclosure, the compositions are substantially free of a cross-linking agent, such as a peroxide. The phrase "substantially free" is intended to mean that if an amount of cross-linking agent is found in the composition, the amount is so negligible that the effect of the cross-linking agent cannot be obtained. In other words, the amount of cross-linking agent found in the composition cannot initiate curing of the elastomeric or thermoplastic polymers present in the composition, or initiates a substantially negligible amount of cross-linking. Preferably and advantageously, the compositions of the present disclosure do not include any cross-linking agent (i.e., the composition contain zero percent cross-linking agent). Nonetheless, if the equipment used to manufacture the compositions of the present disclosure are used to manufacture other non-related compositions that may include a cross-linking agent, the inventors recognize that an unintended negligible amount of cross-linking agent may be added to the compositions of the present disclosure during manufacture thereof.

The compositions according to the present disclosure may each include a polymeric material and a chemical blowing agent. The compositions may also include an antioxidant, an emulsifier, a tackifier, and a filler material. Other additives such as nucleating agents, surfactants, lubricants, and elastomers may also be included. As noted above, the compositions are substantially free of a cross-linking agent. Although the compositions do not include a cross-linking agent, the compositions yield sealants or baffles that expand when heated. Specifically, the compositions when heated form a foam having a cellular structure that is configured to seal a cavity of the vehicle, and prevent the infiltration of moisture, dust, air, and other undesirable fluids from entering the cavity. Moreover, the foam assists in preventing the attenuation of sound within the cavity of the vehicle.

In this regard, the constituents of the compositions may be pre-mixed and subsequently injection molded into a part that is sized and shaped to fit within the desired cavity of the vehicle (e.g., within a hollow A-pillar, B-pillar, C-pillar, engine rail, or rocker panel of the vehicle) before the vehicle is painted and heated in a paint-bake cycle to cure the paint at temperatures that range between 140 degrees C. (284 degrees F.) and 210 degrees C. (410 degrees F.). As the vehicle is heated during the paint-bake cycle, the part foams and expand to fill and seal the cavity. Preferably, the compositions expand from about 400 percent to about 1300 percent when heated. Thus, although the compositions are substantially free of a cross-linking agent, the compositions of the present disclosure expand to amounts that are similar to compositions that include a cross-linking agent without the added cost of the cross-linking agent, and without the drawbacks of including a cross-linking agent such as cracking, skinning, inhomogeneous foam quality, or premature curing of the compositions before being heated.

The compositions of the present disclosure include a polymeric material. Preferably, the polymeric material is a thermoplastic material such as low density polyethylene (LDPE), ethylene vinyl acetate (EVA), ethyl methyl acrylate (EMA), ethylene-n-butyl acrylate (EnBA), ethylene-glycidyl methacrylate (EnGMA), and mixtures thereof. The LDPE may include a combination of a high melt flow LDPE and linear low density polyethylene (LLDPE). Other polymeric materials that may be added to the compositions of the present disclosure include elastomers such as ethylene-propylene-diene monomer (EPDM) and styrene-butadiene rubber (SBR). The selected polymeric or elastomeric material must have a melt strength sufficient to prevent escape of the decomposing blowing agent during heating of the compositions in the paint-bake cycle. The melt strength of the polymeric material is its resistance to stretching when in a molten state. The properties of the material that affect the resistance to stretching are molecular weight and molecular branching. As each property increases, melt strength is improved at low shear rates.

Regarding molecular weight, it is preferred that the polymeric materials such as, for example, LDPE have a molecular weight ($M_w$) in the range from about 100'000 g/mol to 1'000'000 g/mol. For material such as EVA, EMA, and EnBA, it is preferred that the molecular weight be in the range from about 100'000 g/mol to about 360'000 g/mol. Especially preferred molecular weight ranges are for LDPE 150'000 to 400'000 g/mol, for EMA 200'000 to 350'000 g/mol, for LLDPE 100'000 to 200'000 g/mol, for EVA 150'000 to 350'000 g/mol, for EnBA 200'000 to 350'000 g/mol, and for EnGMA 150'000 to 250'000 g/mol. All these molecular weight values refer to $M_w$ measurements done at 140° C. in 1,2,4-trichlorobenzene with a flow of 1 mL/min and relative to polystyrene standard.

Figure 1:
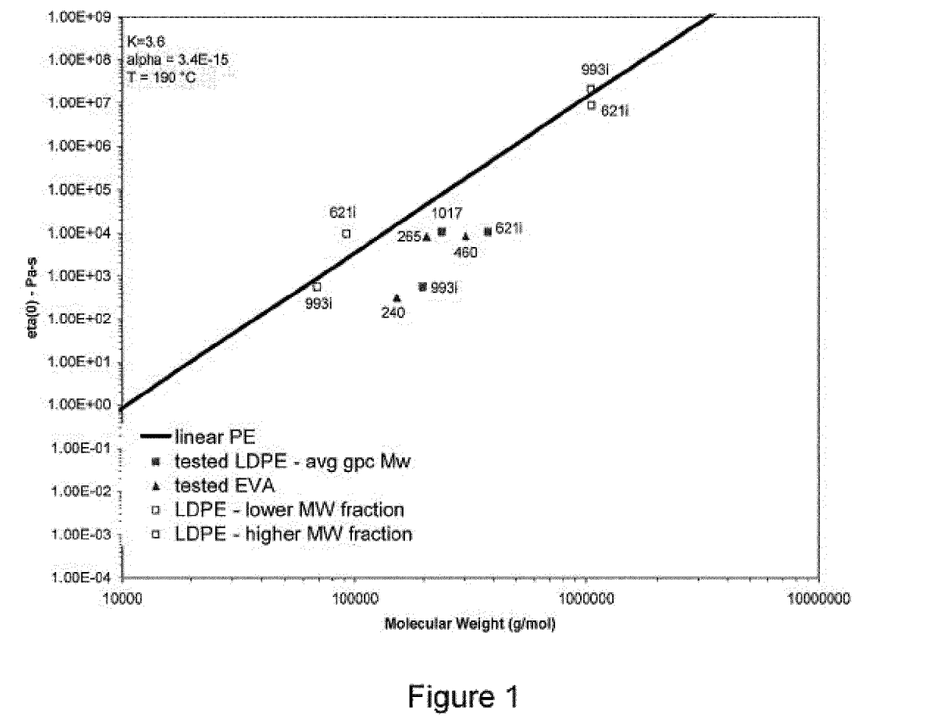
FIG. 1 is a graph illustrating the relationship between zero shear viscosity and molecular weight for various polymer materials according to a principle of the present disclosure.

With respect to molecular branching, the amount of long chain branching (LCB) in the polymeric material has a significant effect on the melt rheology of the polymeric material that prevents escape of the decomposing blowing agent during heating of the compositions according to the present disclosure. A method used to determine the amount of long chain branching in the polymeric material includes determining the zero shear viscosity (no) of the material, sometimes also denoted as "low shear viscosity" for experimental reasons. In this document, zero shear viscosity and low shear viscosity mean the same. In general, as the zero shear viscosity increases, the melt strength of the polymer increases. For example, referring to FIG. 1 of the application, the zero shear viscosity of various LDPE and EVA materials are illustrated in comparison to linear polyethylene (PE). The data points below the curve that represents the linear PE have a large amount of LCB, and represent satisfactory LDPE and EVA polymeric materials that can be used in accordance with the present disclosure. In particular, it is preferred that the zero shear viscosity of the polymeric material be in the range of 100 Pa-s to 10000000 Pa-s. Preferably, the zero shear viscosity of the polymers suitable for the present invention is between 100 Pa s and 50'000 Pa s, more preferably between 500 Pa s and 25'000 Pa s, most preferably between 1'000 Pa s and 20'000 Pa s.

Further important viscosity parameters defining the suitability of polymers for the present invention can be determined by the ASTM D4440-15 standard method. In particular, the parameters δ (delta), meaning the loss modulus divided by the storage modulus, and the parameter η*(eta), meaning the complex viscosity, are significant for polymers suitable for the present invention. It is preferred that the polymers used in the present invention have a logarithmic value of the tangent of δ, i.e., log(tan δ), of between −0.2 and 0.2, more preferably between −0.1 and 0.1. It is also preferred that the same polymeric materials have a logarithmic value of η*, i.e. log(η*), of between 3 and 4, more preferably between 3.25 and 3.75. Within this parametric window are the most preferred polymer materials for the present invention.

Exemplary commercially available LDPEs include 621i, 772, 993i, and 1017 from Dow Chemical and LD100 BW from ExxonMobil. Exemplary commercially available LLDPEs include LL1102 from ExxonMobil. Exemplary commercially available EMAs include Lotryl 24MA005 and 18MA02N from Arkema. Exemplary commercially available EVAs include Elvax 240, 265, 460, and 470 from DuPont. Exemplary commercially available EnBAs include Lotryl 30BA02N and Lotryl 35BA40 from Arkema. An exemplary commercially available EnGMA includes Lotader ADX 1200 S from Arkema. An exemplary commercially available EPDM includes Nordel 4725 available from Dow Chemical.

If the selected polymeric material is LDPE by itself, the compositions of the present disclosure may include the LDPE in amounts that range between 75 percent by weight to 90 percent by weight. Conversely, if the selected polymeric material is a mixture of LDPE and LLDPE, the compositions may include the LDPE in amounts that range between 15 percent by weight to 90 percent by weight, and include the LLDPE in amounts that range between 25 percent by weight and 80 percent by weight. If the selected polymeric material is EVA, the compositions may include EVA in amounts that range between 80 percent by weight to 95 percent by weight. If the selected polymeric material is EMA, the compositions may include EMA in amounts that range between 80 percent by weight to 90 percent by weight. If the selected polymeric material is EnBA, the compositions may include EnBA in amounts that range between 70 percent by weight to 90 percent by weight. It should also be understood that various blends of LDPE, LLDPE, EVA, EMA, and EnBA may also be used without departing from the scope of the present disclosure.

The compositions of the present disclosure include at least one chemical blowing agent. A chemical blowing agent is a substance that decomposes, e.g. under elevated temperature conditions, and is capable of producing gaseous decomposition products which may form a cellular structure in the thermoplastic matrix via a foaming process. Specifically, as the blowing agent is heated, the blowing agent undergoes chemical reaction and/or decomposition that results in the release of a gas or gases. As the gas is released, the melt strength of the polymeric material described above enables the molten material to stretch without breaking and allowing the gas or gases to escape. This results in the formation of a foam. Chemical blowing agents that may be used in the compositions of the present disclosure include, for example, bicarbonate salts such as sodium bicarbonate, 4,4'-oxybis (benzenesulfonylhydrazide) (OBSH), p-toluenesulfunyl hydrazide (TSH), benzenesulfunyl hydrazide (BSH), dinitro pentamethylene tetramine (DMPT), p-toluenesulfonyl semicarbazide (PTSS), carbamates, and azodicarbonamide.

Particularly preferred blowing agents are OBSH and bicarbonate salts, especially sodium bicarbonate. Suitable as bicarbonate salts are those of formula $XHCO_3$, wherein X stands for a generic cation, in particular an alkali metal ion, preferably $Na^+$ or $K^+$, wherein $Na^+$ is particularly preferred. Other suitable cations may be selected form the group consisting of $NH_4^+$, ½ $Zn^{2+}$, ½ $Mg^{2+}$, ½ $Ca^{2+}$, and mixtures thereof.

In preferred embodiments, the bicarbonate salt is combined with a polycarbonic acid. Suitable polycarbonic acids include organic di-, tri- or tetra-acids, which preferably are soild at room temperature (23° C.). Preferred are hydroxy-functional or unsaturated polycarbonic acids, such as citric acid, tartaric acid, malic acid, maleic acid, or fumaric acid. Especially preferred is citric acid. Also suitable are salts of the acids mentioned above, especially salts with the cations $Na^+$, $K^+$, $NH_4^+$, ½$Zn^{2+}$, ½ $Mg^{2+}$, ½ $Ca^{2+}$, and mixtures thereof. Most preferred are salts of $Na^+$ or $K^+$. The most preferred combination of bicarbonate blowing agent and polycarbonic acid is the combination of soldium bicarbonate with citric acid and/or a citrate salt, in particular $Na^+$ or $K^+$ citrate. The polycarbonic acid, in particular citric acid, may be comprised in the bicarbonate salt with an amount of, e.g., 30 percent by weight up to 90 percent by weight.

The compositions of the present disclosure include the blowing agent in amounts that range between 5 percent by weight to 20 percent by weight. The chemical blowing agent may be used with or without an activator such as a urea, an imidazole, or a metal oxide such as zinc oxide.

The blowing agent is preferably used in powder form. This means that the substances used as blowing agent are preferably solid under ambient conditions (ambient pressure, 23° C.) and with preference in finely dispersed powder form.

For the preferred blowing agent OBSH, this means OBSH is preferably in powder form, comprising particles with a mean particle size of D50 from 1 to 15 μm (μm), preferably from 4 to 13 μm, very preferably from 6 to 10 μm and a particle size distribution characterized by a D10 from 0.1 to 3.0 μm, preferably 0.5 to 2 μm, more preferably 1 to 1.5 μm, and a D90 from 3 to 40 μm, preferably 5 to 30 μm, more preferably 15 to 25 μm.

For the other preferred blowing agent sodium bicarbonate, the preferred form is also powder form, wherein the preferred mean particle size D50 is between 1 and 30 μm, preferably between 5 to 25 μm, more preferably between 10 and 20 μm, and the particle size distribution is preferably characterized by a D10 from 0.1 to 4 μm, preferably between 1 and 3.5 μm, more preferably between 2 and 3 μm, and a D90 from 5 to 100 μm, preferably from 15 to 80 μm, more preferably from 25 to 75 μm.

The "mean particle size" refers to the volume average determined by laser diffraction particle size analysis. D50 is the mean particle size for the volume distribution, where half of the particles based on volume are below this value.

The term "particle size distribution" refers to the width of the distribution which is characterized by D10 and D90, where D10 describes the particle size based on volume where 10% of the distribution is below and D90 the particle size based on volume where 90% of the distribution is below. A smaller difference between D10 and D90 means a narrower size distribution.

The compositions of the present disclosure may include various additives for UV resistance, flame retardance, oxidation resistance, and as a processing aid. Regarding oxidation resistance, it should be understood that practically all polymer materials undergo oxidative degradation reactions, which may occur at one or all of the manufacturing, processing and end-use stages. Antioxidants are highly effective in preventing this degradation to the extent that physical and mechanical property loss is kept within acceptable limits before and after foaming. An exemplary commercial antioxidant that may be used in the compositions of the present disclosure is Irganox 1010 from BASF, which is a sterically hindered phenolic antioxidant. The compositions of the present disclosure may include the antioxidant in amounts that range between 0.1 percent by weight to 0.5 percent by weight.

The compositions of the present disclosure may include a polyethylene wax as an emulsifier (e.g., as a processing aid). As the polyethylene wax emulsifier, a commercialized product such as Marcus Wax may be used. The compositions of the present disclosure may include the polyethylene wax in amounts that range between 2 percent by weight to 10 percent by weight.

The compositions of the present disclosure may optionally include a tackifying resin. The use of a tackifying resin increases the tackiness of the pre-formed parts, which assists in holding the pre-formed part within the cavity at the desired location before and after heating of the part during the paint-bake cycle. In this regard, the metal (e.g., steel, aluminum, etc.) substrates that are used to manufacture the vehicle body can be oily before being subjected to the paint-bake cycle. The tackifying resin, therefore, assists in preventing disengagement between the pre-formed part and the metal substrates before foaming. The tackifying resin, however, is optional because the tackifying resin may increase the tendency of the pre-formed parts to stick to one another during storage and transportation of the parts. Exemplary resins that may be included in the compositions of the present disclosure include hydrocarbon resins, C5 resins, C9 resins, phenolic resins, saturated resins, unsaturated resins, and partially saturated resins. The compositions of the present disclosure may include the tackifying resin in amounts that range between 0 percent by weight to 5 percent by weight.

The compositions according to the present disclosure may include a filler material. Exemplary filler materials include calcium carbonate and calcium oxides, which are generally non-reactive and reduce the costs associated with manufacturing the compositions due to less polymeric materials being required. Commercially available calcium carbonates include Quincy 325. Commercially available calcium oxides include Polycal OS325. The filler may include a coating formed from a material such as a stearic acid. Commercially available coated fillers include a stearic acid-coated calcium carbonate filler such as Winnofil SPT. The compositions of the present disclosure may include the filler material in amounts that range between 0 percent by weight to 15 percent by weight. Other exemplary fillers include talc, silica, clay, nanoclay, titanium oxide, wallostonite, and aramid fibers.

One preferred embodiment of the present inventive composition comprises between 15 and 85 percent by weight of LDPE and between 7.5 and 75 percent by weight of LLDPE, wherein the total amount of LDPE and LLDPE preferably is between 75 and 90 percent by weight, based on the total composition before expansion. Furthermore, this embodiment comprises between 5 and 10 percent by weight of blowing agent, preferably OBSH. This embodiment has exceptionally high expansion values over the whole temperature range of between 150° C. and 210° C.

Another preferred embodiment comprises between 70 and 92 percent by weight of EVA, or a mixture of different EVAs. Furthermore, this embodiment comprises between 5 and 12 percent by weight of blowing agent, preferably OBSH. This embodiment has exceptionally high expansion values over the whole temperature range of between 150° C. and 210° C.

Another preferred embodiment comprises between 70 and 90 percent by weight of EMA, or a mixture of different EMAs. Furthermore, this embodiment comprises between 5 and 12 percent by weight of blowing agent, preferably OBSH. This embodiment has exceptionally high expansion values over the whole temperature range of between 150° C. and 210° C.

Another preferred embodiment comprises between 30 and 45 percent by weight of EVA, and between 30 and 45 percent by weight of EnBA. Furthermore, this embodiment comprises between 10 and 20 percent by weight of blowing agent, preferably sodium bicarbonate, which optionally comprises between 30 and 90 percent by weight, based on the weight of the blowing agent, of citric acid. This embodiment has exceptionally high expansion values especially at the high temperature range of between 180° C. and 210° C.

Another preferred embodiment comprises between 15 and 25 percent by weight of EVA, between 30 and 50 percent by weight of EnBA, between 5 and 15 percent by weight of EMA, and between 5 and 15 percent by weight of EnGMA. Furthermore, this embodiment comprises between 10 and 20 percent by weight of blowing agent, preferably sodium bicarbonate, which optionally comprises between 30 and 90 percent by weight, based on the weight of the blowing agent, of citric acid. This embodiment has exceptionally high expansion values especially at the high temperature range of between 180° C. and 210° C., as well as excellent adhesion on substrates such as oily metal.

Another aspect of the present invention is the use of such thermally expandable compositions for the manufacturing of baffle and/or reinforcement elements or components. Such elements are used to seal, baffle, and/or reinforce hollow structures, e.g. a cavity in a hollow structural part of an automobile. Hollow parts in cars may include body components (e.g., panels), frame components (e.g., hydroformed tubes), pillar structures (e.g., A, B, C, or D-pillars), bumpers, roofs, or the like.

This aspect of the present invention is thus an expansible sealant and baffle component for sealing and providing an acoustic baffle for a cavity that is subjected to a predetermined elevated temperature during a manufacturing operation, the component comprising:
a polymeric material selected from the group consisting of low density polyethylenes (LDPE), linear low density polyethylenes (LLPDE), ethylene vinyl acetate (EVA), ethylene methacrylate (EMA), ethylene-butyl acrylate (EnBA), and mixtures thereof; and a chemical blowing agent selected from the group consisting of 4,4'-oxybis(benzenesulfonylhydrazide) and sodium bicarbonate; and
optionally a carrier element;
wherein the component is substantially free of a cross-linking agent.

With regard to activation of the thermally expandable composition according to the present invention when used in automotive manufacturing, it is advantageous to couple the thermal activation of the composition with another process step involving heat treatment. An example for such a process step is electrocoating (cathodic dip painting/coating) of the chassis or car body.

In one preferred embodiment, such a baffle and/or reinforcement element for hollow structures consists essentially of a thermally expandable composition. In this case, it is advantageous to design the shape of the element in a way that it can be easily fitted into and attached to the walls of the hollow structure to be baffled and/or reinforced. Manufacturing is in this case preferably done by injection moulding, punching or stamping, or extrusion through a shape template.

In another preferred embodiment, such a baffle and/or reinforcement element for hollow structures comprises, apart from the thermally expandable composition, a carrier element on which the inventive thermally expandable composition is deposited or attached. Such a design may be more cost-efficient and it may facilitate fixation of the baffle and/or reinforcement element on the walls of the structure to be baffled and/or reinforced, e.g. by incorporation of pins, bolts, or hooks on the carrier element. Furthermore, with a suitable design of the carrier element, the mechanical performance and stability of the baffle and/or reinforcement element according to the present invention can be increased.

Said carrier element may consist of any material that can be processed into a shape useable for an embodiment of the present invention. Preferred materials are polymeric materials, such as a plastic, elastomers, thermoplastics, thermosettable polymers, a blend or other combination thereof, or the like. Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Especially preferred are high-temperature stable polymers such as poly(phenyl ethers), polysulfones, polyethersulfones, polyamides, preferably polyamide 6, polyamide 6,6, polyamide 11, polyamide 12, or a mixture thereof. Other suitable materials include metals, especially aluminium or steel, or naturally grown, organic materials, such as wood or other (pressed) fibrous materials. Also glassy or ceramic materials can be used. It is possible to use any combination of such materials. It is also contemplated that such materials can be filled (e.g. with fibres, minerals, clays, silicates, carbonates, combinations thereof or the like) or foamed.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

The manufacturing process of a baffle and/or reinforcement element in accordance with the present invention depends largely on the material of the carrier element. If the material of the carrier element can be (injection-) moulded or extruded, the whole baffle and/or reinforcement element can be produced in a two-step injection-moulding process or a co-extrusion process of the carrier element and the thermally expandable composition.

Another aspect of the present invention is the use of the baffle and/or reinforcement element as described above to seal, baffle, or reinforce a cavity or hollow structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

A further aspect of the present invention is a method for sealing, baffling and/or reinforcing a cavity or hollow structure, characterised in that an element comprising a thermally expandable composition according as described above is introduced into said cavity or hollow structure and subsequently thermally expanded such that said cavity or hollow structure is at least partially filled by the expanded composition. Preferred temperature for the thermal expansion process is between 140° C. and 210° C. Preferred baking time for the compositions is between 5 min and 30 min.

The compositions of the present disclosure will now be described in relation to various Example Compositions (Examples 1-32) and Comparative Compositions (Examples A-L). The Example Compositions are substantially free of a cross-linking agent, while the Comparative Examples include a peroxide cross-linking agent (DC40C available from Akrochem). The amounts of the materials in each of the Example Compositions and Comparative Compositions are listed in percent by weight, based on the total compositions before expansion. See Tables 1 and 2, below, for experiments 1-20 and A-G.

The Example Compositions and Comparative Compositions were each prepared by weighing the materials thereof, and placing the materials in a container that is subsequently continuously rotated for a predetermined period of time (e.g., 1 to 24 hours) to satisfactorily intermix the materials. Then, the mixture of materials was either fed into a hopper and extruded using a twin-screw extruder such as a Buss kneader, or intermixed using a small-batch mixer including Banbury blades and then pressed to a thickness of 1 mm to 5 mm. The extruded mixture was then pelletized and injection molded to form molded parts. The molded or pressed parts were then baked at temperatures that ranged between 150 degrees C. and 210 degrees C. to foam the parts. The volumetric expansion of each part after foaming was then determined in comparison to each of the parts before baking. The Example Compositions, Comparative Compositions, and their resultant volumetric expansions at various temperatures can be seen in Tables 1 and 2.

These results are further corroborated by the results presented in Tables 3 and 4. These experiments include both inventive (21-31) and non-inventive reference examples (H-K). Also in these tables, compositions (in weight percent, based on the total composition prior to expansion) and volumetric expansion data (in %, based on the volume of the original non-expanded composition) are shown.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Raw Material | | | | | | | | | | |
| LDPE (621i) | 85.2 | | | | | | 78 | | | |
| LDPE (772) | | 80.5 | 62.5 | 44.6 | 26.7 | 17.8 | | | | |
| LLDPE (LL 1002) | | 8.9 | 26.7 | 44.6 | 62.5 | 71.4 | | | | |
| EMA (Lotryl 24MA005) | | | | | | | | | | |
| EMA (Lotryl 18MA02N) | | | | | | | | | | |
| EVA (Elvax 460) | | | | | | | | 74.58 | 73.22 | 84.395 |
| EVA (Elvax 470) | | | | | | | | 10 | 10 | |
| EVA (Elvax 240) | | | | | | | | | | |
| EVA (Elvax 265) | | | | | | | | | | |
| EMBA (Lotryl 30BA02) | | | | | | | | | | |
| EPDM (Nordel 4725) | | | | | | | | | | |
| Calcium Carbonate | 7 | 3 | 3 | 3 | 3 | 3 | 12.56 | | | |
| Calcium Oxide | | | | | | | | | 5.73 | |
| Coated CaCO3 | | | | | | | | 6.84 | 2.69 | 7.015 |
| OBSH (blowing agent) | 7.5 | 7.5 | 7.5 | 7.5 | 7.5 | 7.5 | 9.44 | 8.58 | 8.35 | 8.991 |
| Sodium Bicarbonate | | | | | | | | | | |
| Antioxidant (Irganox 1010) | 0.3 | | | | | | 0.3 | 0.3 | 0.3 | 0.3 |
| Tackifying Resin (Wingtack 86) | | | | | | | | | | |
| Polyethylene Wax | 3 | | | | | | | | | |
| Volume Expansion | | | | | | | | | | |
| 20 min at 150 C. | 682 | 779 | 719 | 824 | 820 | 871 | 826 | n/a | n/a | n/a |
| 20 min at 163 C. | 953 | 1072 | 1103 | 1110 | 1125 | 1116 | 1028 | 1033 | 1041 | 974 |
| 20 min at 191 C. | 928 | 979 | 1069 | 1077 | 1068 | 1065 | 936 | 970 | 965 | 930 |
| 20 min at 210 C. | 905 | 895 | 1041 | 1020 | 1056 | 1038 | 923 | 905 | 912 | 856 |

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Raw Material | | | | | | | | | | |
| LDPE (621i) | | | | 79.2 | | | 78 | | | |
| LDPE (772) | | | | | | | | | | |
| LLDPE (LL 1002) | | | | | | | | | | |
| EMA (Lotryl 24MA005) | | | | | | | | | | |
| EMA (Lotryl 18MA02N) | | | | | | | | | | |
| EVA (Elvax 460) | 86.006 | 87 | 66.45 | | | | | | | |
| EVA (Elvax 470) | 6.057 | | 3.55 | | | | | | | |
| EVA (Elvax 240) | | | | | | | | | | 78 |

TABLE 1-continued

|  |  |  |  |  |  |  |  |  |  |  |
|---|---|---|---|---|---|---|---|---|---|---|
| EVA (Elvax 265) |  |  |  |  |  |  |  |  | 78 | 39.65 |
| EMBA (Lotryl 30BA02) |  |  |  |  | 78 | 78 |  |  |  |  |
| EPDM (Nordel 4725) |  |  |  |  |  |  |  |  |  | 39.65 |
| Calcium Carbonate |  |  |  | 3 | 7 |  |  |  |  |  |
| Calcium Oxide | 0.421 |  | 15 |  |  | 7 | 7 | 7 | 7 |  |
| Coated CaCO3 |  | 1.99 | 10 |  |  |  |  |  |  |  |
| OBSH (blowing agent) | 7.517 | 11.01 | 5 | 7.5 |  |  |  |  |  |  |
| Sodium Bicarbonate |  |  |  |  | 14.7 | 14.7 | 14.7 | 14.7 | 14.7 | 20.5 |
| Antioxidant (Irganox 1010) | 0.3 | 0.3 | 0.3 | 0.3 | 0.3 | 0.3 | 0.3 | 0.3 | 0.3 | 0.2 |
| Tackifying Resin (Wingtack 86) |  |  |  | 3 |  |  |  |  |  |  |
| Polyethylene Wax |  |  |  | 7 |  |  |  |  |  |  |
| Volume Expansion |  |  |  |  |  |  |  |  |  |  |
| 20 min at 150 C. | n/a | n/a | n/a | n/a | 507 | 447 | 619 | 399 | 458 | 481 |
| 20 min at 163 C. | 952 | 1337 | 578 | 605 | 515 | 457 | 522 | 354 | 482 | 527 |
| 20 min at 191 C. | 834 | 1364 | 551 | 653 | 487 | 446 | 513 | 372 | 502 | 493 |
| 20 min at 210 C. | 784 | 1085 | 543 | 620 | 459 | 373 | 543 | 296 | 524 | 404 |

TABLE 2

|  | Example A | Example B | Example C | Example D | Example E | Example F | Example G |
|---|---|---|---|---|---|---|---|
| Raw Material |  |  |  |  |  |  |  |
| LDPE (621i) | 81.9 | 83.29 | 74.67 | 89.17 | 76.25 | 86 |  |
| LDPE (772) |  |  |  |  |  |  |  |
| LLDPE (LL 1002) |  |  |  |  |  |  |  |
| EMA (Lotryl 24MA005) |  |  |  |  |  |  |  |
| EMA (Lotryl 18MA02N) |  |  |  |  |  |  |  |
| EVA (Elvax 460) |  |  |  |  |  |  |  |
| EVA (Elvax 470) |  |  |  |  |  |  |  |
| EVA (Elvax 240) |  |  |  |  |  |  |  |
| EVA (Elvax 265) |  |  |  |  |  |  |  |
| EMBA (Lotryl 30BA02) |  |  |  |  |  |  | 77 |
| Peroxide (DC40C) | 0.25 | 3.46 | 1.28 | 0.77 | 0.9 | 0.52 | 0.5 |
| EPDM (Nordel 4725) |  |  |  |  |  |  |  |
| Calcium Carbonate | 7 | 4.06 | 14.6 |  | 15 | 8.5 | 7 |
| Calcium Oxide |  |  |  |  |  |  |  |
| Coated CaCO3 |  |  |  |  |  |  |  |
| OBSH (blowing agent) | 7.5 | 9.2 | 9.46 | 10.06 | 7.85 | 5 |  |
| Sodium Bicarbonate |  |  |  |  |  |  | 15 |
| Antioxidant (Irganox 1010) | 0.3 | 0.3 | 0.3 | 0.3 | 0.3 | 0.3 | 0.3 |
| Tackifying Resin (Wingtack 86) |  |  |  |  |  |  |  |
| Polyethylene Wax | 3 |  |  |  |  |  |  |
| Volume Expansion |  |  |  |  |  |  |  |
| 20 min at 150 C. | 682 | 739 | 814 | 749 | 712 | 710 | 481 |
| 20 min at 163 C. | 953 | 845 | 928 | 1004 | 1120 | 1045 | 527 |
| 20 min at 191 C. | 928 | 857 | 936 | 916 | 999 | 1003 | 493 |
| 20 min at 210 C. | 905 | 819 | 923 | 830 | 916 | 942 | 404 |

TABLE 3

Composition data (in wt.-%) and expansion data (in %) of inventive (numbers) and non-inventive (letters) experiments.

|  | Ex. H | Ex. 21 | Ex. 22 | Ex. 23 | Ex. 24 | Ex. 25 | Ex. 26 | Ex. 27 |
|---|---|---|---|---|---|---|---|---|
| Raw material |  |  |  |  |  |  |  |  |
| EVA (Elvax 470A) |  |  | 39 | 36 | 19.5 |  |  |  |
| EnBA (Lotryl 35BA40) |  |  |  |  |  | 56.39 | 31.50 |  |
| EnBA (Lotryl 30BA02) | 77.2 | 78 | 39 | 36 | 39 | 33.40 | 53.15 | 68 |
| EMA (Lotryl 24MA005) |  |  |  |  | 9.75 |  |  | 17 |
| EnGMA (Lotader ADX 1200S) |  |  |  |  | 9.75 |  |  |  |
| Polyethylene wax |  |  |  | 6 |  |  |  |  |

TABLE 3-continued

Composition data (in wt.-%) and expansion data (in %) of inventive (numbers) and non-inventive (letters) experiments.

|  | Ex. H | Ex. 21 | Ex. 22 | Ex. 23 | Ex. 24 | Ex. 25 | Ex. 26 | Ex. 27 |
|---|---|---|---|---|---|---|---|---|
| Calcium Carbonate | 7 | 7 | 7 | 7 | 7 |  |  |  |
| Sodium Bicarbonate ($NaHCO_3$) | 15 | 15 |  |  |  |  |  |  |
| ($NaHCO_3$) (D50 12 μm, D90 29.3 μm) |  |  |  |  |  | 5 |  |  |
| ($NaHCO_3$) (37 wt.-% citric acid) |  |  |  |  |  | 5 |  |  |
| ($NaHCO_3$) (80 wt.-% citric acid) |  |  | 15 | 7.5 | 7.5 |  | 15 | 15 |
| ($NaHCO_3$) (90 wt.-% citric acid) |  |  |  | 7.5 | 7.5 |  |  |  |
| Peroxide (DC40) | 0.5 |  |  |  |  |  |  |  |
| Antioxidant (Irganox 1010) | 0.3 |  |  |  |  | 0.20 | 0.35 |  |
|  | 100 | 100 | 100 | 100 | 100 | 100 | 100 | 100 |
| Volume expansion |  |  |  |  |  |  |  |  |
| 20 min at 150° C. | 447 | 619 | 208 | 150 | 188 | 463 | 252 | 193 |
| 20 min at 163° C. | 457 | 522 | 573 | 713 | 494 | 485 | 453 | 578 |
| 20 min at 180° C. | n/a | n/a | 1054 | 986 | 1015 | n/a | n/a | n/a |
| 20 min at 191° C. | 446 | 513 | 954 | 1062 | 988 | 659 | 945 | 858 |
| 20 min at 210° C. | 373 | 543 | 385 | 219 | 1167 | 582 | 533 | 463 |

TABLE 4

Composition data (in wt.-%) and expansion data (in %) of inventive (numbers) and non-inventive (letters) experiments.

|  | Ex. 28 | Ex. I | Ex. J | Ex. 29 | Ex. K | Ex. 30 | Ex. 31 |
|---|---|---|---|---|---|---|---|
| Raw material |  |  |  |  |  |  |  |
| LDPE (621i) | 82.2 |  |  |  |  |  |  |
| EMA (Lotryl 24MA005) |  | 14.9 | 8 | 20.9 | 19.35 | 16.74 | 24.04 |
| EMA (Lotryl 18MA02N) |  | 66.6 | 70.7 | 66.5 | 70.24 | 65.83 | 62.5 |
| Polyethylene wax | 3 |  |  |  |  |  |  |
| Calcium Carbonate | 7 | 7.1 | 10.1 | 4 | 1.65 | 7.95 | 4.49 |
| OBSH (blowing agent) | 7.5 | 7.1 | 7.8 | 8.3 | 8.12 | 9.18 | 8.67 |
| Peroxide (DC-40C) |  | 4 | 3.1 |  | 0.34 |  |  |
| Antioxidant (Irganox 1010) | 0.3 | 0.3 | 0.3 | 0.3 | 0.3 | 0.3 | 0.3 |
|  | 100 | 100 | 100 | 100 | 100 | 100 | 100 |
| Volume expansion |  |  |  |  |  |  |  |
| 20 min at 150° C. | 805 | 739 | 814 | 826 | 749 | 712 | 710 |
| 20 min at 163° C. | 944 | 845 | 928 | 1028 | 1004 | 1120 | 1045 |
| 20 min at 180° C. | n/a | n/a | n/a | n/a | n/a | n/a | n/a |
| 20 min at 191° C. | 874 | 857 | 936 | 940 | 916 | 999 | 1003 |
| 20 min at 210° C. | 869 | 819 | 923 | 956 | 830 | 916 | 942 |

As can be seen in Tables 1 to 4, although the compositions of the present disclosure do not include a cross-linking agent the compositions each exhibited satisfactory expansion. That, the samples each unexpectedly expanded in amounts similar to the comparative compositions that utilized a cross-linking agent. Because the compositions of the present application do not include a cross-linking agent, however, the cost to produce the compositions of the present application is reduced, and the drawbacks associated with the use of cross-linking agents is negated. Further, because no cross-linking agents are used, a reduction in the use of chemicals that are potentially harmful to people and the environment is achieved.

In order to demonstrate the foam surface quality of the expanded inventive compositions compared to similar cross-linked composition according to the state of the art, two model formulations were prepared. The composition details of those model formulations are shown in Table 5.

TABLE 5

Composition data (in wt.-%) and expansion data (in %) of inventive experiment 32 and non-inventive experiment L.

|  | Ex. 32 | Ex. L |
|---|---|---|
| Raw material |  |  |
| LDPE (LD100 BW) | 77.7 | 74.7 |
| Calcium Carbonate | 7 | 7 |
| Sodium Bicarbonate (37 wt.-% citric acid) | 15 | 15 |

TABLE 5-continued

Composition data (in wt.-%) and expansion data (in %) of inventive experiment 32 and non-inventive experiment L.

|  | Ex. 32 | Ex. L |
|---|---|---|
| Peroxide (DC-40C) |  | 1.5 |
| Antioxidant (Irganox 1010) | 0.3 | 0.3 |
| Dipentaerythrytritol pentaacrylate |  | 1.5 |
|  | 100 | 100 |
| Volume expansion |  |  |
| 20 min at 180° C. | 326 | 428 |

Figure 2:
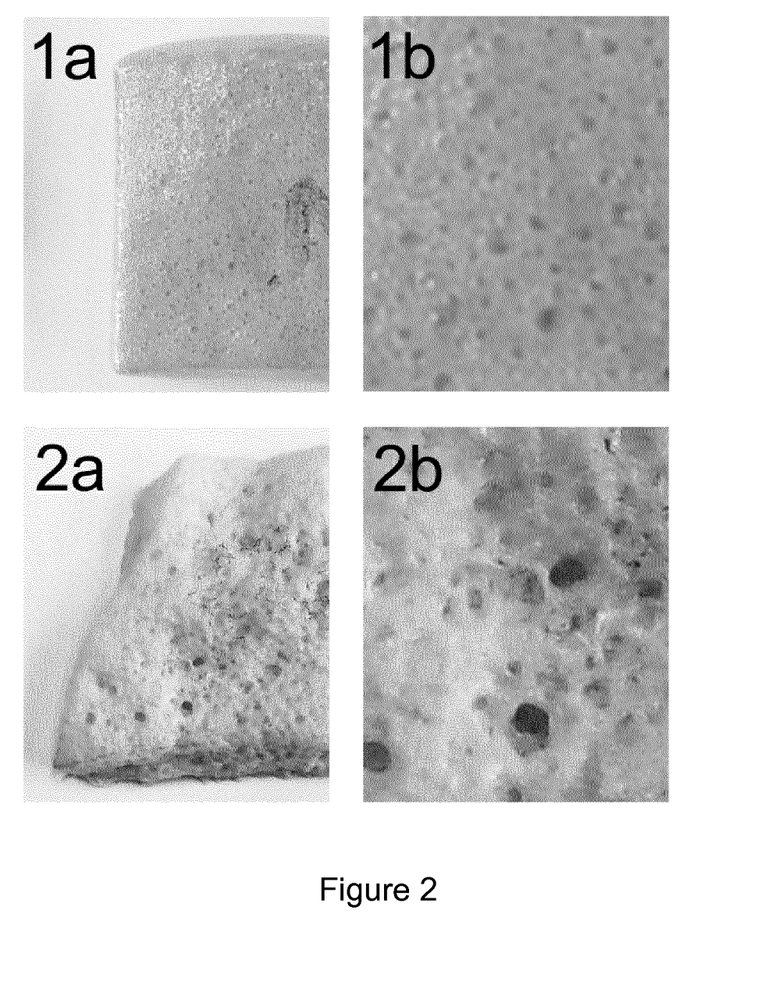
FIG. 2 includes photographs of an inventive composition after expansion (1a) including an enhanced view of the surface (1b), as well as a non-inventive reference composition after expansion (2a) including an enhanced view of the surface (2b).

The two model compositions of Table 5 were expanded at 180° C. during 20 min. The resulting foams were photographed and are shown in comparison in FIG. 2. The top two photographs show inventive composition 32 after expansion. Picture 1a shows a view of about half of the expanded foam, while picture 1b is an enlarged view of the surface. The bottom two photographs show non-inventive composition L after expansion. Picture 2a shows a view of about half of the expanded foam, while picture 1b is an enlarged view of the surface. It is apparent that the surface of the foam according to the invention is much smoother and comprises less undesired surface defects such as macropores than the non-inventive crosslinked reference example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising sealing, baffling or reinforcing a cavity or hollow structure of a land-, water-, or air-vehicle and/or a cavity of a building such that the transmission of noise, vibrations, humidity, and/or heat is reduced, and/or the object surrounding said cavity is mechanically strengthened with an expansible sealant or baffle component, the component comprising:
a polymeric material selected from the group consisting of low density polyethylenes (LDPE), linear low density polyethylenes (LLPDE), ethylene vinyl acetate (EVA), ethylene methacrylate (EMA), ethylene-butyl acrylate (EnBA), and mixtures thereof, the polymeric material having:
a logarithmic value of a tangent of loss modulus divided by storage modulus ($\log(\tan \delta)$) in a range of from −0.2 to 0.2, and
a logarithmic value of complex viscosity ($\log(\eta^*)$) in a range of from 3 to 4, the $\log(\tan \delta)$ and the $\log(\eta^*)$ being determined according to ASTM D4440-15;
a chemical blowing agent selected from the group consisting of 4,4'-oxybis(benzenesulfonylhydrazide) and sodium bicarbonate; and
optionally a carrier element;
wherein the component is substantially free of a cross-linking agent.

2. The method according to claim 1, wherein the polymeric material is LDPE in an amount in a range of from 75 percent by weight to 90 percent by weight.

3. The method according to claim 1, wherein a zero shear viscosity of the polymeric material is in the range of from 100 Pa·s to 50000 Pa·s.

\* \* \* \* \*